United States Patent [19]
Bessette et al.

[11] Patent Number: 6,078,114
[45] Date of Patent: Jun. 20, 2000

[54] METHOD AND APPARATUS FOR VIBRATION REDUCTION/CONTROL IN A VARIABLE RELUCTANCE LINEAR MOTOR

[75] Inventors: Steven C. Bessette, Maine; Charles A. Coots, Binghamton; James E. York, Endicott; Andrew Zalesski, Apalachin, all of N.Y.

[73] Assignee: Universal Instruments Corporation, Binghamton, N.Y.

[21] Appl. No.: 09/058,004

[22] Filed: Apr. 8, 1998

[51] Int. Cl.[7] ............................. H02K 41/00; H02K 5/24
[52] U.S. Cl. ................................................. 310/12; 310/51
[58] Field of Search ................................. 310/12, 13, 14, 310/51

[56] References Cited

U.S. PATENT DOCUMENTS

| | | | |
|---|---|---|---|
| 4,282,768 | 8/1981 | Osborn | 74/473 R |
| 4,755,703 | 7/1988 | Ueno | 310/184 |
| 4,868,431 | 9/1989 | Karita et al. | 310/12 |
| 5,084,661 | 1/1992 | Tanaka | 318/685 |
| 5,241,229 | 8/1993 | Katakura et al. | 310/51 |
| 5,374,882 | 12/1994 | Matsubara et al. | 318/560 |
| 5,376,851 | 12/1994 | Lipo et al. | 310/179 |
| 5,491,598 | 2/1996 | Stricklin et al. | 310/51 X |
| 5,726,542 | 3/1998 | Ebihara | 318/135 X |

*Primary Examiner*—Nestor Ramirez
*Assistant Examiner*—Judson H. Jones

[57] ABSTRACT

A variable reluctance linear motor has a stator and an armature mounted so as to be movable along the length of the stator. Armature bearings are mounted to the armature via mechanical vibration dampers and contact the stator so that vibrations in the stator are transmitted to the bearings and dissipated in said vibration dampers. A sensor is mounted to the armature for obtaining position data for the armature with respect to the stator. A controller then calculates the phase currents for the motor phases based on the position data and a desired force value. The phase currents are calculated to maintain a minimum normal force between the armature and said stator, thereby further reducing vibrations. A conditional filter is applied when armature is within a predetermined distance from a desired location. The conditional filter, after a time delay, clamps the velocity feedback to a predetermined range and simultaneously reduces the velocity loop gain.

31 Claims, 8 Drawing Sheets

PRIOR ART

NO CONDITIONAL FILTER

FIG. 8A
PRIOR ART

WITH CONDITIONAL FILTER

FIG. 8B

METHOD AND APPARATUS FOR VIBRATION REDUCTION/CONTROL IN A VARIABLE RELUCTANCE LINEAR MOTOR

FIELD OF THE INVENTION

The present invention relates to a method and apparatus for reducing both the magnitude of, and the sensitivity to, vibrations in a variable reluctance linear motor.

BACKGROUND OF INVENTION

In high accuracy servo systems requiring fast settling times and precision positioning any vibrations within the frequency range of the system's required velocity loop bandwidth create a major control system problem with stability. If these conditions are also highly nonlinear or multivariable dependent, the problem becomes even worse.

In a high accuracy positioning system using a variable reluctance linear motor, these vibration problems occur mainly at the point when the system is moving slowly or approaching the desired location. One cause of these vibrations is the high normal forces associated with the stator and armature of the motor, and the interaction between the stator, armature, bearings, commutation, feedback mechanism, etc., which cause nonlinear vibrations to excite resonance frequencies.

When such a motor is operating at high accelerations, the currents applied to the motor phases are relatively high. These high currents generate a strong magnetic attraction (normal) force between opposing motor cores. The strong normal force helps to preload the mechanical pieces of the motor and helps eliminate any hysteriesis or "slop" within the system. As the motor positions the load near its desired location, however, the currents within the motor phases are reduced, thereby reducing the normal force and relaxing the mechanical system. This effective reduction in stiffness adversely affects the velocity loop stability allowing undesirable resonances to occur.

One way to eliminate or control the vibration would be either to lower the velocity loop bandwidth or increase the friction in the system. These proposed solutions would, however, have negative effects on system performance in the way of settle time, accuracy and temperature rise. Another method would be the use of low order linear filters such as low pass or notch filters. These however, would have significant effects on velocity loop bandwidth since the vibration/resonance frequency is within the desired system bandwidth.

SUMMARY OF THE INVENTION

It is, therefore, an object of the present invention to provide a variable reluctance linear motor in which vibration is controlled or reduced.

Another object of the present invention is to provide a mechanical damper between the stator and armature of a variable reluctance linear motor.

A further object of the present invention is to provide a variable reluctance linear motor in which the normal force between the stator and armature is kept above a desired level.

Yet another object of the invention is to provide a variable reluctance linear motor having conditional filtering of the control feedback loop.

The above and other objects are achieved in accordance with a first aspect of the present invention by a variable reluctance linear motor having a stator and an armature mounted so as to be movable along the length of the stator. Armature bearings are mounted to the armature via mechanical vibration dampers and contact the stator so that vibrations in the stator are transmitted to the bearings and dissipated in the vibration dampers.

In a second aspect of the present invention, a sensor is mounted to the armature for obtaining position data for the armature with respect to the stator. A controller then calculates the required phase currents for the motor phases based on the position data and a desired force value. The phase currents are calculated to maintain a minimum normal force between the armature and stator.

In a third aspect of the present invention a conditional filter is applied when the armature is within a predetermined distance from a desired location. The conditional filter, after a time delay, clamps the velocity feedback to a predetermined range and simultaneously reduces the velocity loop gain.

These and other objects, features and advantages of the present invention will be apparent and fully understood from the following detailed description of the preferred embodiments, taken in connection with the appended drawings.

DETAILED DESCRIPTION OF THE PREFERRED EMBODIMENT

Figure 1:
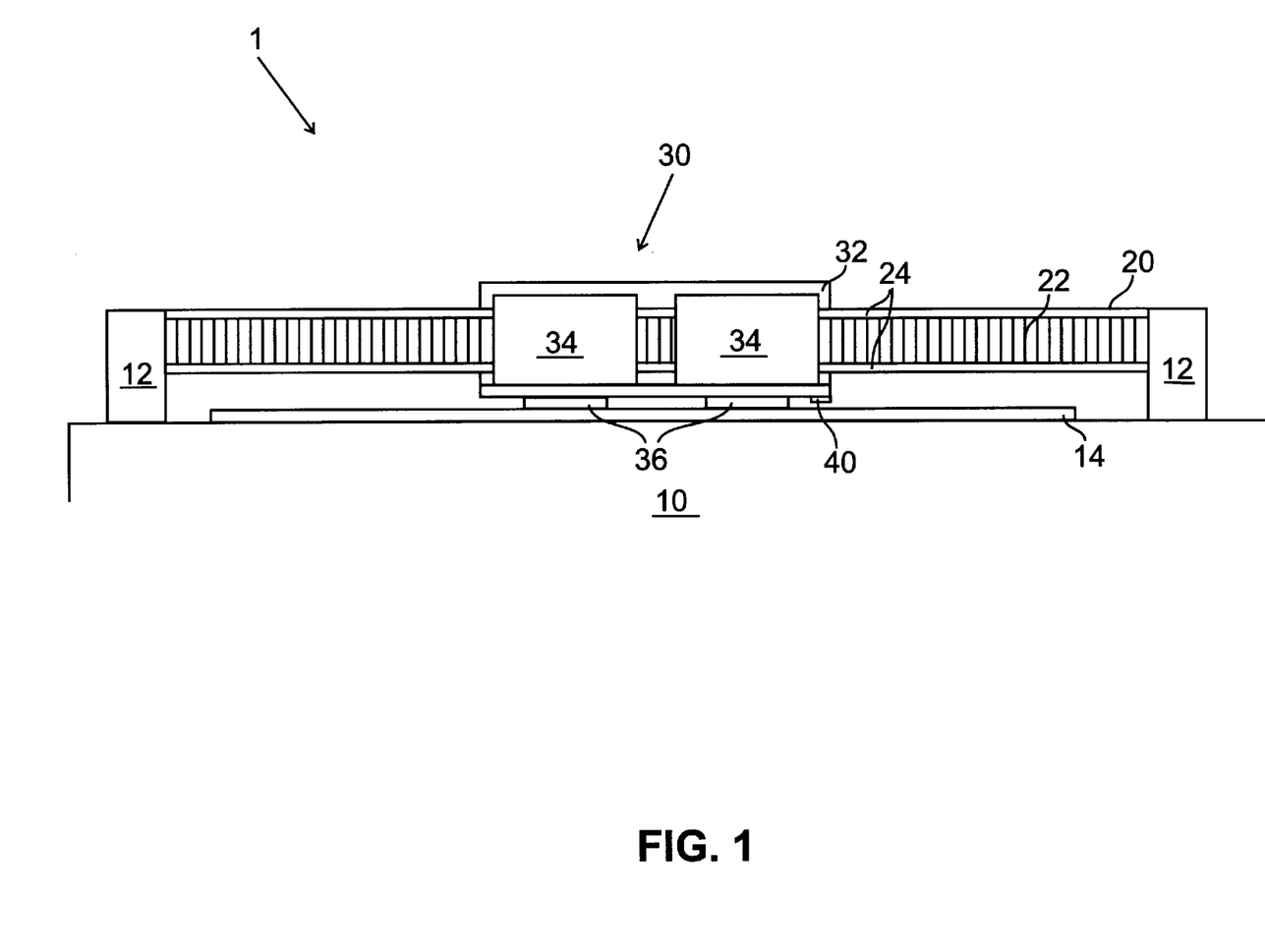
FIG. 1 is an elevational view of a variable reluctance linear motor according to the present invention.

Referring to FIG. 1, a variable reluctance linear motor 1 according to the present invention is illustrated. The motor 1 includes a stator 20 having teeth 22 on both sides. The stator 20 is mounted to a stable base 10 by stator supports 12. An armature assembly 30 is mounted about the stator 20 and supported by linear bearings 36 so as to be moveable along the stator 20. The armature assembly 30 includes two armature modules 34 mounted to an armature carriage 32. A sensor 90 is also mounted to the carriage 32 and interacts with a linear encoder 14 to register precisely the location of the armature assembly 30 along the stator 20.

Figure 2:
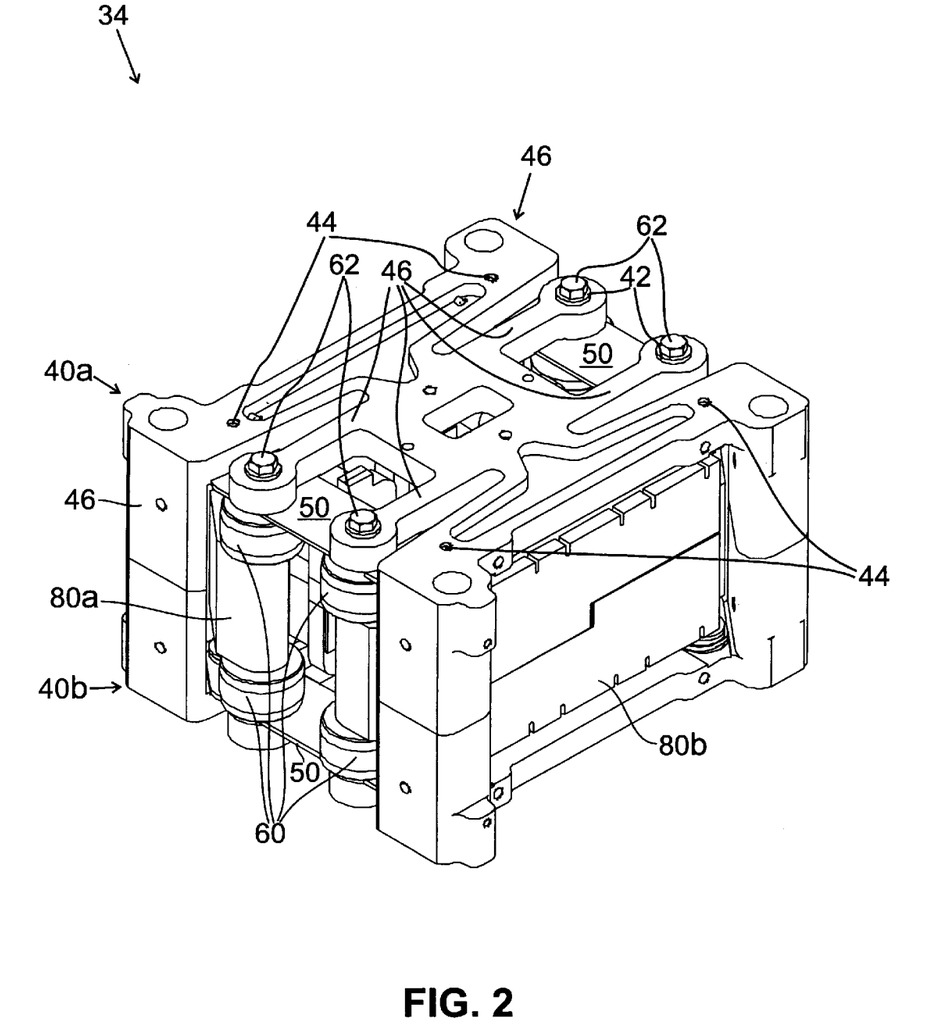
FIG. 2 is a perspective view of an armature module of the linear motor of FIG. 1.
Figure 3:
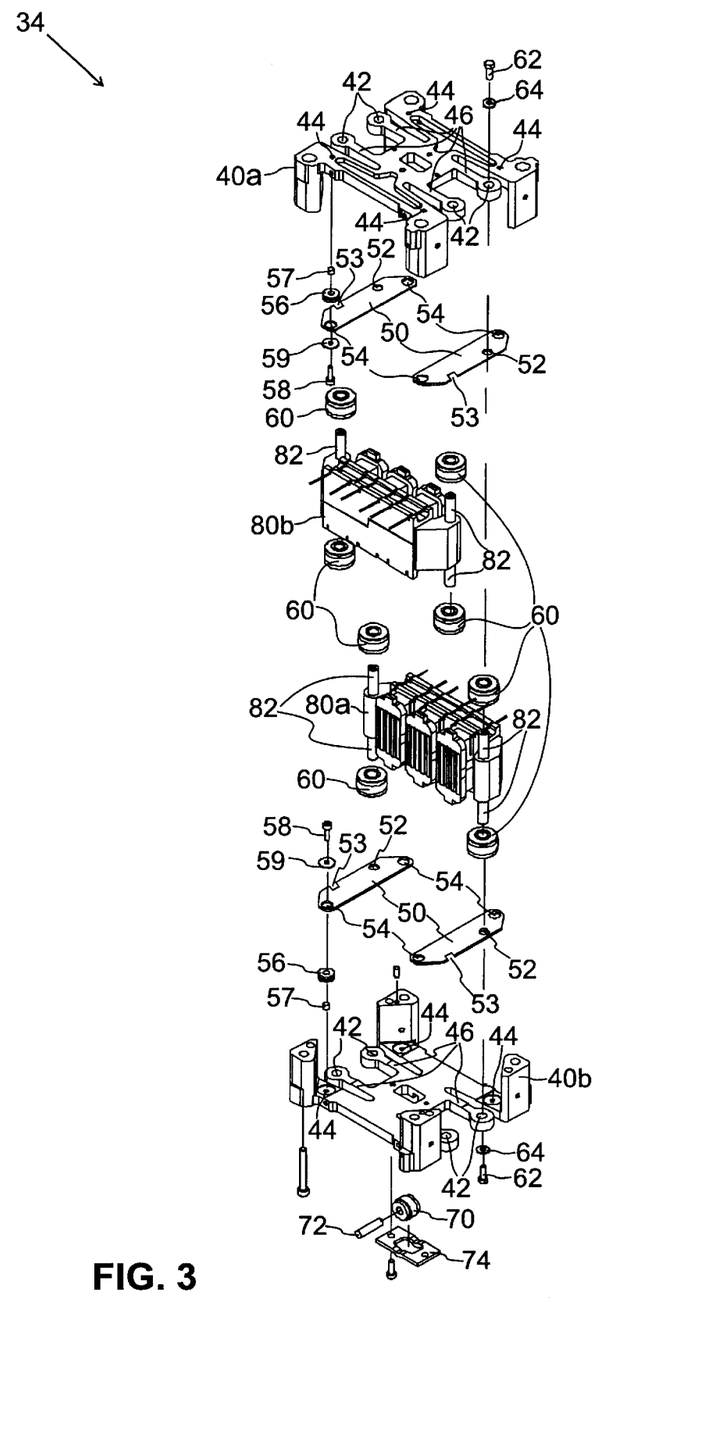
FIG. 3 is an exploded view of the armature module of FIG. 2.
Figure 4:
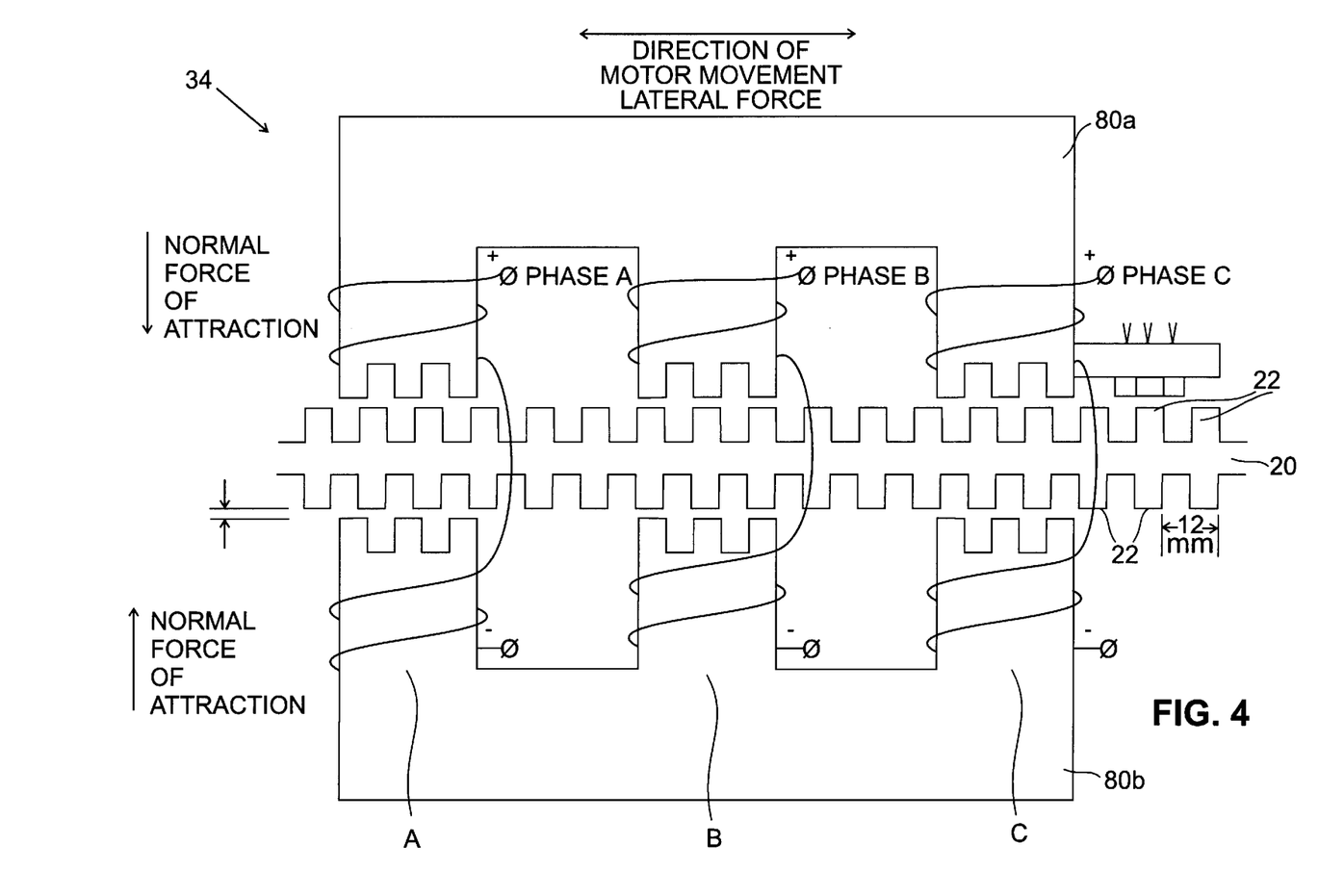
FIG. 4 is a schematic diagram of an armature module and the stator of the motor of FIG. 1.

As illustrated in FIGS. 2–4, each armature module 34 is an independent coupled three-phase armature. The modules 34 are mounted to the carriage 32 and wired such that the corresponding phases of the two modules 34 act in unison as a single phase. In other words, the modules 34 are mounted to the carriage 32 such that the teeth of the corresponding phases of the armature modules 34 are in identical alignment with the teeth 22 of the stator 20 and identical currents are applied to the corresponding phases. It should be apparent, however, that other arrangements, for example using more modules or only one module, may be employed and still be within the scope of the present invention. Similarly, a different number of phases may be used.

As best seen in FIGS. 2 and 3, each armature module 34 is comprised of a top housing 40*a* and a bottom housing 40*b* which support the two e-cores 80*a* and 80*b* of the armature module 34. In the illustrated embodiment, the top housing 40*a* and the bottom housing 40*b* are identical to reduce manufacturing costs. A roller bearing 70 is mounted by shaft 72 and plate 74 to the bottom housing 40*b* so as to contact the bottom of stator 20. Bearing 70 provides vertical support for the stator 20 as the armature assembly 30 moves along its length.

The e-cores 80*a/b* are mounted in the housing 40*a/b* in opposition such that when in place about the stator 20, the e-cores 80*a/b* are positioned adjacent opposite sides of the stator 20 so as to interact with the teeth 22 on both sides. (See FIG. 4). The corresponding phases of the e-cores 80*a/b* are aligned with each other and have identical currents applied to them so as to act as a single phase. The e-cores 80*a/b* have two shafts 82 at each end (four shafts 82 on each e-core 80*a/b*) on which are mounted roller bearings 60. The roller bearings 60 travel along the side surfaces of the stator 20 along bearing surface 24 (see FIG. 1) above and below the teeth 22 so as to maintain the e-cores 80*a/b* a constant distance from the stator 20. This arrangement allows the armature 30 to track the stator 20 at a very close distance, 2-3/1000 of an inch in the illustrated embodiment. (See FIG. 4).

The e-cores 80*a/b* of the preferred embodiment are retained within the housing 40*a/b* by bolts 62. Although only two of these bolts 62 are shown in FIG. 3, it should be understood that four bolts 62 are used for each e-core 80*a/b* (see FIG. 2). The shafts 82 fit into holes 42 in the housing 40*a/b*. The holes 42 in the housing 40*a/b* are a transitional clearance fit with the shafts 82 to prevent movement of the shafts 82 in the holes 42. The bolts 62 pass through washers 64 and are threaded into shafts 82. The holes 42 in the housing 40*a/b* are located at the ends of cantilevered springs 46, which are machined out of the housing 40*a/b*. The springs 46 provide a suspension that allows the armatures 80*a/b* to comply to the stator surface and compensates for slight bending or misalignment of the stator 20 as the armature 30 travels back and forth along its length. It should be understood, however, that other biasing element arrangements may be utilized.

Referring to FIG. 2, felt wipers (not shown) may be attached to the ends 46 of the housing 40*a/b*. These wipers serve the function of applying a light coat of oil on the stator bearing surface 24 to prevent oxidation. In addition, the wipers prevent dust and debris from getting between the bearings 60 and stator 20.

Mechanical Damper

Since the stator 20 is a pseudo simply supported beam, it is highly susceptible to mechanical vibration. In a first aspect of the current invention, this vibration is minimized using a translating damper which is used to damp the stator 20 at the source of the excitation, i.e., the armature 30. In the illustrated embodiment, rigid straps 50 are rigidly mounted to one of the e-cores 80*a* of each module 34 and attached to the motor housing 40*a/b* through polymer damping grommets 56. Energy from the stator 20 is thus transferred through the armature bearings 60 into the rigid straps 50 and is dissipated into the damping grommets 56. This reduces the magnitude of the vibration, making the system more stable.

In each module 34 of the illustrated embodiment, four rigid straps 50 are mounted to the e-core 80*a*. Each shaft 82 of the e-core 80 (on which a bearing 60 is mounted) is fitted within a hole 52 in one of the straps 50. The fit between the shaft 82 and the hole 52 is snug so that vibrations in the stator 20 are transmitted through the bearing 60 to the strap 50. Polymer damping grommets 56 are disposed in mounting holes 54 at either end of the strap 50. Although only two grommets 56 are shown in FIG. 3, it should be understood that two grommets 56 are used on each strap 50, for a total of eight for the module 34 shown in FIG. 3. The ends of the straps 50 are then mounted to the housing 40*a/b* by bolts 58 which extend through washers 59 and the grommets 56 and are secured to the housing 40*a/b* at holes 44. To reduce wear of the grommets 56, metal sleeves 57 are inserted in each grommet 56 to act as a barrier between the bolt 58 and the grommet 56.

As seen in FIG. 3, U-shaped apertures 53 are located in the strap 50 to provide clearance for the shafts 82 of the other e-core 80*b*. These U-shaped apertures 53 are larger than the outer diameter of the shafts 82 to avoid interfering with the movement of the other e-core 80*b*. This is necessary to allow the armature suspension to comply to the stator 20 keeping the armature bearings 60 in contact.

It should be understood that other alternative arrangements are contemplated and should be considered to be within the scope of the present invention. For example, the bearings 60 which contact the stator 20 need not be mounted to the e-cores 80*a/b*, but instead may be mounted directly to the armature housing 40*a/b* via mechanical dampers such as polymer grommets. In such a case, the e-cores 80*a/b* may be rigidly mounted to the housing (without straps 50) or mounted as disclosed above. In addition, mechanical dampers other than those disclosed may be employed, for example, dampers using pneumatic or hydraulic pressure.

Electromagnetic Preload

In accordance with another aspect of the invention an electromagnetic preload in the motor's phase commutation system is employed to further reduce vibrations.

Figure 5:
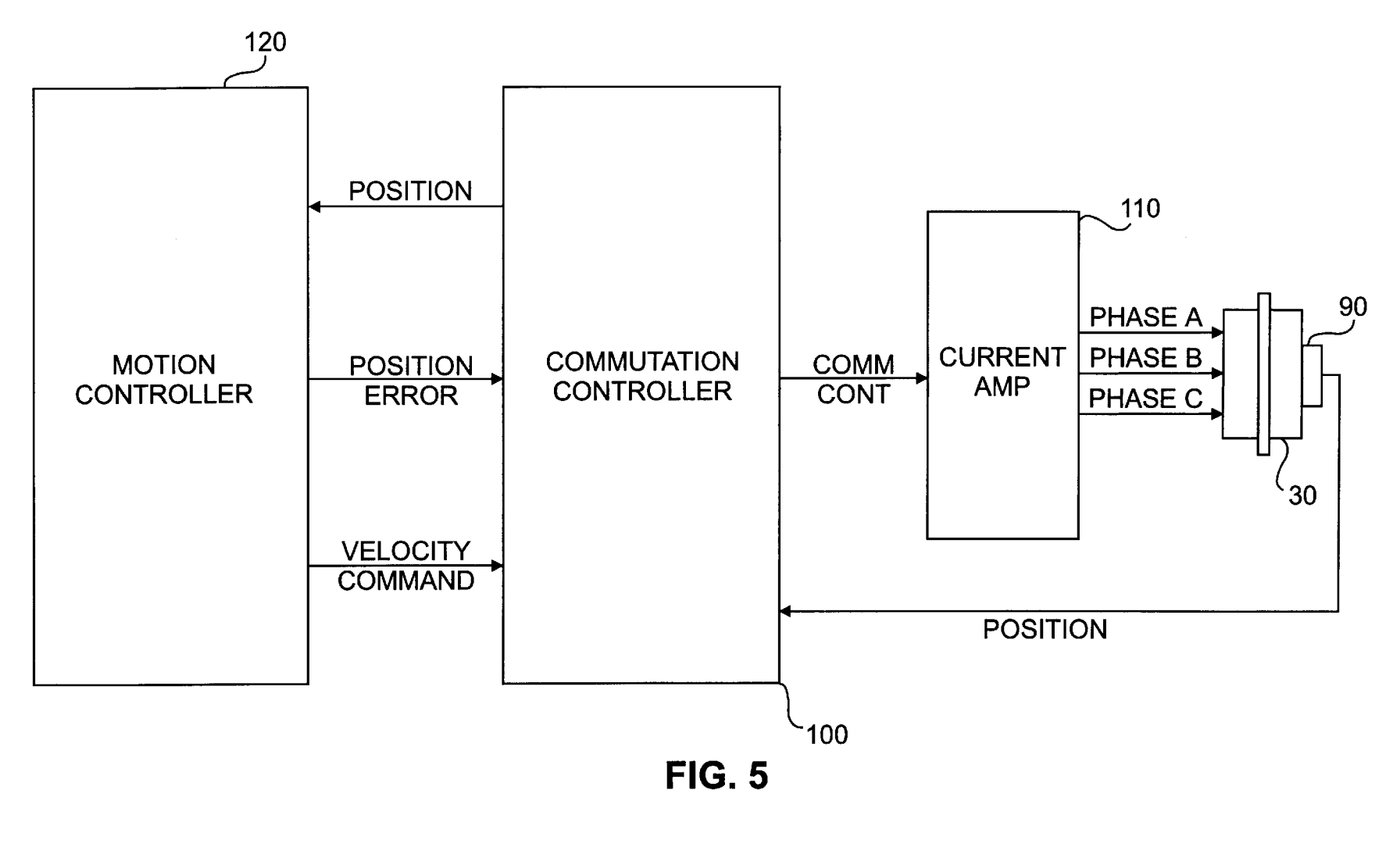
FIG. 5 is a block diagram of the interface between the controller and armature of the linear motor of FIG. 1.

Referring to FIGS. 4 and 5, in a typical servo motor control, commutation is applied which excites the phases of the motor causing the motor to generate a force in the linear direction of movement. In a closed loop servo driven positioning system the desired force is the result of a closed loop design which derives an output based on the position/velocity errors in the system. Using these values, the system calculates the current required to be applied to each phase in order to achieve the required linear force.

To account for nonlinearities in the system, the currents in the phases are controlled, for example, in accordance with U.S. Pat. No. 5,621,294, which is incorporated herein by reference. In accordance with the '294 patent, the sensor 90 mounted to the armature 30 (see FIG. 1 herein) determines the position of the armature 30 with respect to the stator 20 and sends that information to a commutation controller 100 and a motion controller 120. The motion controller 120 generates velocity commands in response to this feedback and sends the velocity commands to the commutation controller 100. The commutation controller 100 uses this information, together with the position feedback data to calculate a desired lateral force and to determine the required phase currents to achieve this force using a look-up table and interpolation. The phase currents are then sent to an amplifier 110 which sends the appropriate currents to the armature 30.

Figure 6A:
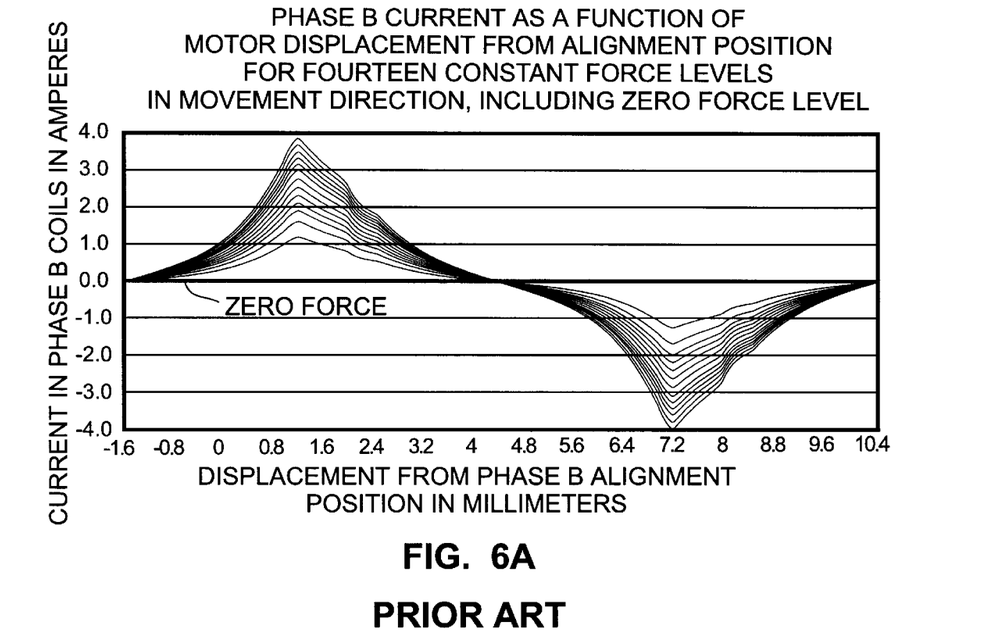
FIG. 6A is a graph illustrating the phase current of one phase of a prior art linear motor as a function of motor displacement for fourteen constant force levels.

FIG. 6A illustrates the current in one phase (phase B) as a function of motor displacement from the phase B alignment position for fourteen constant force levels. The currents are periodic for every 12 mm of displacement since the pitch of the teeth 22 on the stator 20 is 6 mm, and current polarity changes every tooth pitch. (See FIG. 4). The current waveforms for phases A and C are derived by shifting the graph for phase B (FIG. 6A) 8 mm and 4 mm, respectively. Although only fourteen discrete force levels are illustrated in FIG. 6A, 64 force levels for 375 individual motor positions were used for the illustrated embodiment.

When the armature 30 approaches the desired location the desired linear force (i.e., force in the direction of movement) approaches zero. Consequently, as can be seen in FIG. 6A, the motor control currents also approach zero until the target location is reached. When the target location is reached, the desired linear force is zero, labeled "Zero Force" in FIG. 6A, and all phase currents equal zero. This causes a simultaneous reduction in the normal force of attraction between the e-cores 80a/b of the armature and the stator 20 to zero resulting in a reduction in stiffness of the system.

Figure 6B:
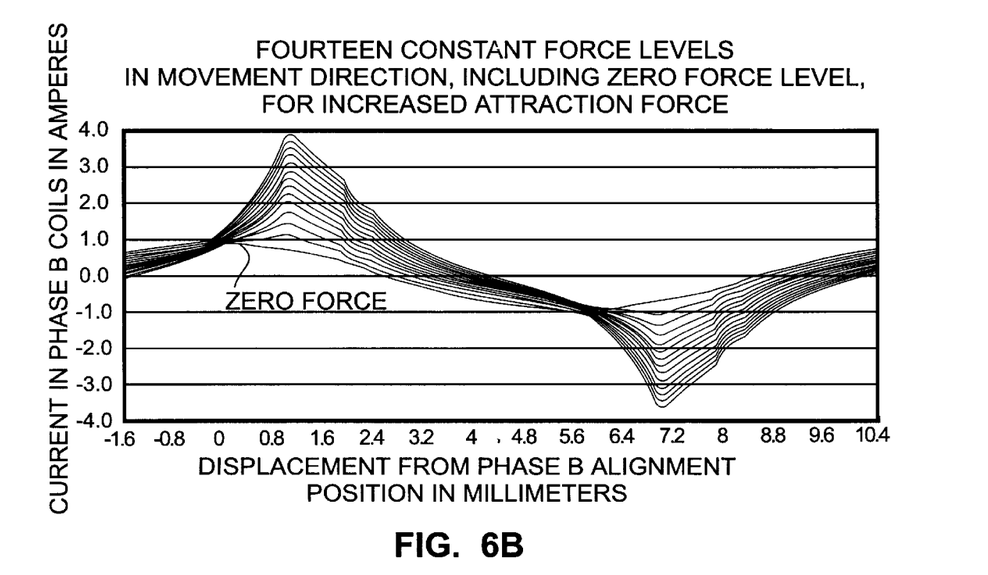
FIG. 6B is a graph illustrating the phase current, according to the present invention, of one phase of a linear motor as a function of motor displacement for fourteen constant force levels.

It is the design of one aspect of this invention to embed dynamic offsets into the commutation system which guarantee that the motor phases always have some level of excitation current regardless of desired linear force. These embedded currents sustain the normal force of attraction between the stator 20 and armature 30 of the motor, which keeps the stiffness at a desired level. FIG. 6B illustrates the modified current in phase B as a function of motor displacement according to an embodiment of the present invention. The phase currents were selected so as to sustain some normal force without significantly affecting the lateral force produced by the motor. In other words, any change in the lateral force produced by the offset current in one phase is counteracted by offset currents in the other two phases so that the desired lateral force is maintained. Thus, even for the "Zero Force" level, there will be some current in the phase to maintain the normal force between the armature 30 and stator 20. At the same time, one or both of the other two phases will also have some current flowing which adds to the normal force, while counteracting any lateral force produced in phase B, thereby producing a net normal force with no lateral force element.

Using the values illustrated in FIG. 6B, the motor of the illustrated embodiment maintains a normal force of attraction of about 80 lbs. for Zero Force level, which value does not change for the first eight force levels. This value then increases for higher force levels. The added stiffness which results reduces the magnitude of the motor's vibrations making the system more stable.

It should be apparent to one of skill in the art that the linear motor need not employ the '294 patent to implement the electromagnetic preload of the present invention. Provided some current level is maintained in at least one phase at all times, a normal force will be sustained. The currents used to satisfy the above requirements may be found experimentally using force transducers and DC power supplies for motor phase current control or theoretically.

Conditional Filtering

In a third aspect of the present invention, conditional filtering of the control feedback loop is used to reduce vibrations even further.

Figure 7:
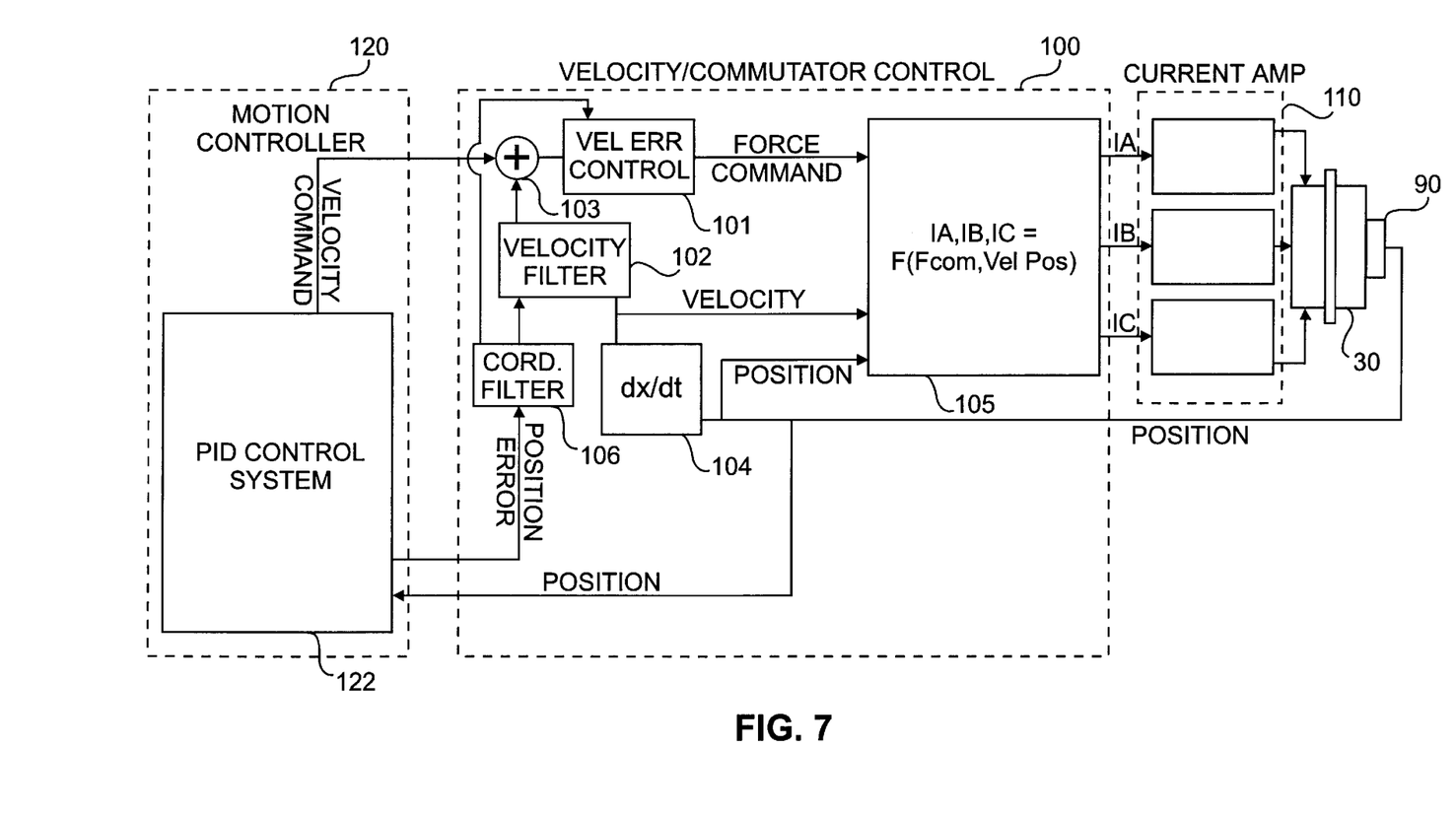
FIG. 7 is a more detailed block diagram of the interface between the controller and armature of the linear motor of FIG. 1.

Referring to FIG. 7, a more detailed block diagram of the interface between the controller and armature of the linear motor of FIG. 1 is shown. As illustrated, the commutation controller 100 includes a differentiating block 104 for differentiating a position value (x) read by sensor 90 over time (t) to obtain a velocity value (dx/dt). The velocity value (dx/dt) is sent through a velocity filter 102 to a summing block 103, which compares it with the velocity command from the motion controller 120. The result is sent to a velocity error control block 101, which applies a velocity loop gain and outputs an actual force command. The commutation block 105 receives the actual force command from velocity error control block 101, the velocity value (dx/dt) from differentiating block 104 and the position value (x) from sensor 90 to calculate the current (IA, IB, IC) required for each phase of the motor. These values are sent to amplifiers 110, which in turn send the corresponding amplified currents to the motor phases.

Figure 8A:
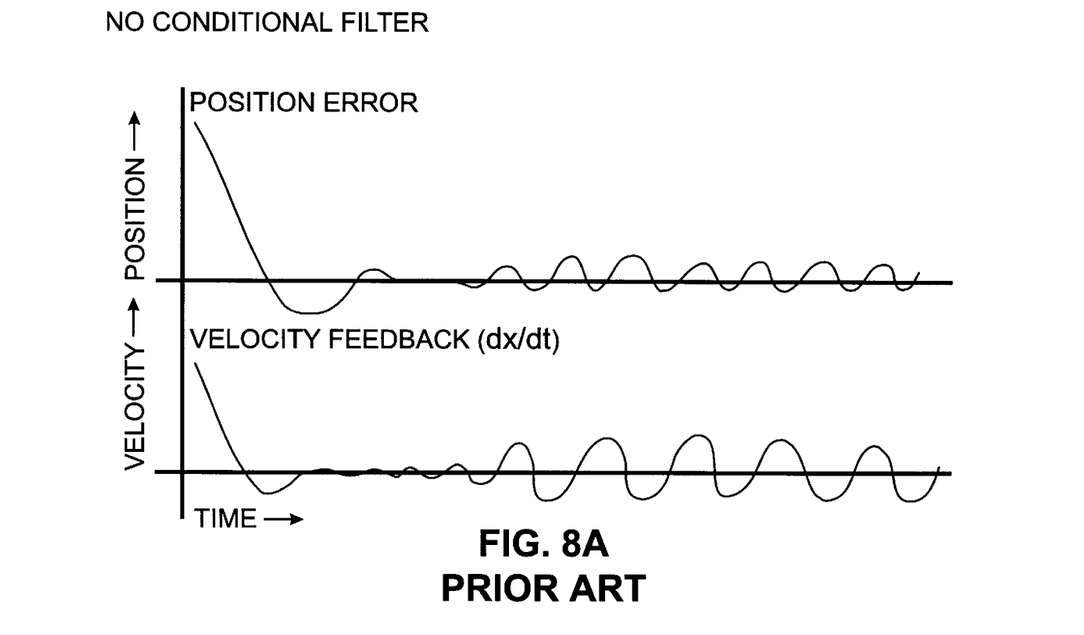
FIG. 8A is a graph of the position error and velocity feedback of the system of FIG. 7 operated according to the prior art.

As shown in FIG. 8A, when operated according to the prior art, the system of FIG. 7 is subject to oscillations once the desired motor location has been reached. This is caused, in part, by the high velocity loop gain employed to achieve high-speed operation of the motor. The conditional filtering of the present invention (FIG. 8B) alleviates this problem by operating at full velocity loop gain until the position error (actual motor location—desired location) becomes less than a certain specified value. When the position error, as reported by the PID control system 122 of the motion controller 120, is less than the specified value (at time $T_f$) the conditional filter 106 is applied. The position error value at which the filter is engaged is selected empirically to be larger than the largest disturbance expected to be experienced by the system once the desired location is reached.

Figure 8B:
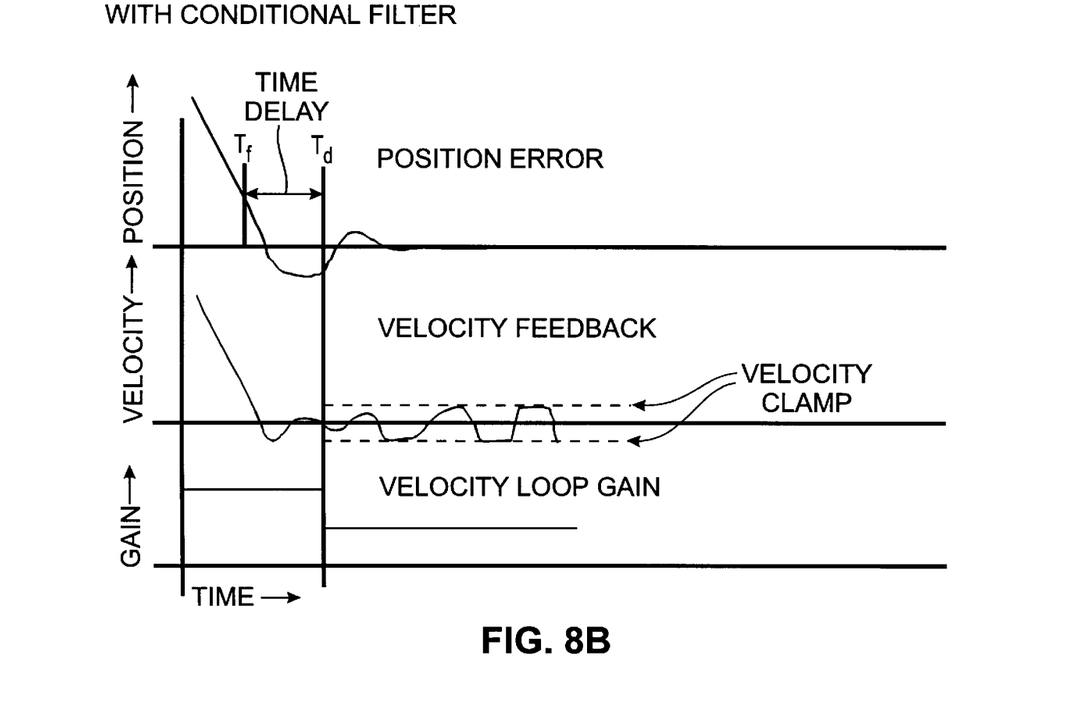
FIG. 8B is a graph of the position error, velocity feedback and velocity loop gain of the system of FIG. 7 operated according to the present invention.

The first stage of the filter 106 is to apply a time delay so the system may complete the normal trajectory and settle to the desired location without a reduction in band width. This is allowable since the mechanical system requires a period of time to unwind (reduce stiffness as the high-normal forces reduce due to lower acceleration requirements and associated lower phase currents). The duration of the time delay is selected to be slightly larger than the time the armature 30 would normally (i.e., without the conditional filter applied) take to travel from the position where the filter is engaged to a steady state at the desired location (before the oscillations discussed above begin). When the time delay has expired (at time $T_d$) the velocity loop gain applied by velocity error control block 101 is reduced since the bandwidth requirements are less to maintain the desired location once it has been reached. The reduction in gain limits the force command and lowers the close loop sensitivity to the unstable vibration elements.

Another feature of the filter 106 is the simultaneous introduction of a velocity clamp at velocity filter 102, which limits the velocity data fed to the summing block 103 to a predetermined range (see FIG. 8B). This component takes advantage of the fact that the system is basically at rest and that only small displacements at low velocities need to be accounted for to hold position. Any small displacement vibrations (i.e., the non-linear vibrations in question) will exhibit a high velocity element due to their vibration frequency. This velocity element will be greater than any expected linear disturbances while holding position. A velocity clamp will limit the velocity feedback to the maximum expected disturbance elements. The velocity clamp thus reduces the system's sensitivity to vibrations by applying a clamp to their value. It should be realized that any small position disturbances with low velocity content will not be affected by the clamp magnitude of the filter allowing the system to respond normally to maintain position.

If the position error is greater than the conditional filter specified value (either due to change in desired location or large disturbance) the conditional filter is removed and initialized to await again for position error less than the specified value. This filtering causes the system to become less sensitive to a reduction in mechanical stiffness but does not negatively impact the settle time required to come into position, as seen in FIG. 8B.

The present invention has been described in terms of illustrated embodiments thereof. Other embodiments, features and variations within the scope of the appended claims will, given the benefit of this disclosure, occur to those having ordinary skill in the art.

What is claimed is:

1. A linear motor comprising:
   a stator;
   an armature mounted proximate said stator, said armature being movable along the length of the stator;
   at least one bearing mounted to said armature, said bearing being in contact with said stator; and
   at least one vibration damper disposed between said armature and said bearing, wherein said vibration damper moves with said armature,
   wherein vibrations in said stator are transmitted to said bearing and dissipated in said at least one vibration damper.

2. The linear motor of claim 1 wherein said vibration damper is a polymer grommet.

3. The linear motor of claim 1 further comprising a stator support bearing mounted to said armature and contacting a bottom surface of said stator.

4. The linear motor of claim 1 wherein said armature comprises:
   an armature housing; and
   at least one core disposed within said housing;
   wherein said at least one bearing is mounted to said core and said core is connected to said housing by said at least one vibration damper.

5. The linear motor of claim 4 wherein said core is retained in said housing by a biasing element.

6. The linear motor of claim 1 wherein said armature has at least two phases, said linear motor further comprising:
   a controller for calculating phase currents based on position data for said armature and applying said phase currents to said at least two phases;
   wherein said phase currents are calculated to maintain a minimum normal force between said armature and said stator.

7. The linear motor of claim 6 further comprising means for reducing said phase currents when said armature is within a predetermined distance of a desired location.

8. The linear motor of claim 1 wherein said armature has at least two phases, said linear motor further comprising:
   a controller for calculating phase currents based on position data for said armature and applying said phase currents to said at least two phases;
   means for reducing said phase currents when said armature is within a predetermined distance of a desired location.

9. A linear motor comprising:
   a stator;
   an armature mounted proximate said stator, said armature being movable along the length of the stator;
   means for transmitting vibrations in said stator to said armature; and
   means connected and movable with said armature for dissipating said vibrations.

10. The linear motor of claim 9 wherein said vibration transmission means comprises at least one bearing mounted to said armature and contacting said stator.

11. The linear motor of claim 9 wherein said vibration dissipation means comprises at least one polymer grommet.

12. The linear motor of claim 9 wherein said armature has at least two phases, said linear motor further comprising:
   means for calculating phase currents for said at least two phases based on position data for said armature;
   wherein said phase currents are calculated to maintain a minimum normal force between said armature and said stator.

13. The linear motor of claim 12 further comprising means for reducing said phase currents when said armature is within a predetermined distance of a desired location.

14. The linear motor of claim 9 further comprising:
   means for calculating phase currents based on position data for said armature;
   means for reducing said phase currents when said armature is within a predetermined distance of a desired location.

15. A method for reducing vibrations in a linear motor having a stator and an armature mounted proximate said stator, said armature being movable along the length of the stator, said method comprising:
   providing at least one vibration damper connected and movable with the armature transmitting said vibrations from said stator to said armature; and
   dissipating said vibrating in said armature by the at least one vibration damper.

16. The method for reducing vibrations in a linear motor of claim 15 wherein the step of transmitting said vibrations comprises mounting at least one bearing between said armature and said stator.

17. The method for reducing vibrations in a linear motor of claim 16 wherein the step of dissipating said vibrations comprises mounting said at least one bearing to said armature via a vibration damper.

18. A variable reluctance linear motor comprising:
   a stator;
   an armature mounted proximate said stator, said armature having at least two phases and being movable along the length of the stator; and
   a controller for calculating phase currents based on position data for said armature and applying said phase currents to said at least two phases;
   wherein said phase currents are calculated to maintain a minimum normal force between said armature and said stator.

19. The variable reluctance linear motor of claim 18 further comprising means for reducing said phase currents when said armature is within a predetermined distance of a desired location.

20. The variable reluctance motor of claim 18 further comprising at least one bearing and at least one vibration damper connecting said bearing with said armature, said bearing contacting said stator such that vibrations in said stator are transmitted to the at least one bearing and dissipated in said vibration damper, said vibration damper moving with said armature.

21. A variable reluctance linear motor comprising:
a stator;
an armature mounted proximate said stator, said armature having at least two phases and being movable along the length of the stator; and
means for calculating phase currents based on position data for the armature and applying said phase currents to said at least two phases;
wherein said phase currents are calculated to maintain a minimum normal force between said armature and said stator.

22. The variable reluctance linear motor of claim 21 further comprising means for reducing said phase currents when said armature is within a predetermined distance of a desired location.

23. The variable reluctance linear motor of claim 21 further comprising
means for transmitting vibrations in said stator to said armature; and
means for dissipating said vibrations at said armature.

24. A method for reducing vibration in a variable reluctance linear motor having an armature, a stator and at least two phases, said method comprising:
obtaining position data for the armature with respect to the stator;
calculating phase currents for said at least two phases based on said position data; and
applying said phase currents to said at least two phases;
wherein said phase currents are calculated to maintain a minimum normal force between said armature and said stator.

25. A variable reluctance linear motor comprising:
a stator;
an armature mounted proximate said stator, said armature having at least two phases and being movable along the length of the stator;
a controller for calculating phase currents based on position data of said armature and applying said phase currents to said at least two phases; and
means for reducing said phase currents when said armature is within a predetermined distance of a desired location;
wherein said controller calculates said phase currents based on velocity data, and wherein said means for reducing said phase currents comprises means for limiting said velocity data to a predetermined velocity range.

26. The variable reluctance linear motor of claim 25 wherein said controller calculates said phase currents by applying a velocity loop gain to said velocity, and wherein said means for reducing said phase currents comprises means for reducing said velocity loop gain.

27. A variable reluctance linear motor comprising:
a stator;
an armature mounted proximate said stator, said armature having at least two phases and being movable along the length of the stator;
a controller for calculating phase currents based on position data of said armature and applying said phase currents to said at least two phases; and
means for reducing said phase currents when said armature is within a predetermined distance of a desired location;
wherein said controller calculates said phase currents by applying a velocity loop gain, and wherein said means for reducing said phase currents comprises means for reducing said velocity loop gain.

28. A variable reluctance linear motor comprising:
a stator;
an armature mounted proximate said stator, said armature having at least two phases and being movable along the length of the stator;
means for calculating a force command based on position data and velocity data of said armature;
means for reducing said force command when said armature is within a predetermined distance of a desired location; and
means for calculating phase currents based on said force command and applying said phase currents to said at least two phases.

29. A method for reducing vibration in a variable reluctance linear motor having an armature with at least two phases and a stator, said method comprising:
obtaining position data for the armature with respect to the stator;
determining velocity data for the armature;
calculating a force command based on said position data and said velocity data;
reducing said force command when said armature is within a predetermined distance of a desired location;
calculating phase currents based on said force command; and
applying said phase currents to said at least two phases.

30. The method of claim 29 wherein the step of reducing said force command comprises reducing a velocity loop gain.

31. The method of claim 29 further comprising limiting said velocity data to a predetermined velocity range when said armature is within said predetermined distance of said desired location.

* * * * *